United States Patent [19]
Gutowski et al.

[11] Patent Number: 5,879,757
[45] Date of Patent: Mar. 9, 1999

[54] SURFACE TREATMENT OF POLYMERS

[75] Inventors: Wojceich S. Gutowski, Frankston; Dong Y Wu; Sheng Li, both of Mount Waverley, all of Australia

[73] Assignee: Commonwealth of Australia Scientific And Research Organisation, Campbell, Australia

[21] Appl. No.: 676,287

[22] PCT Filed: Jan. 20, 1995

[86] PCT No.: PCT/AU95/00025

§ 371 Date: Jul. 18, 1996

§ 102(e) Date: Jul. 18, 1996

[87] PCT Pub. No.: WO95/20006

PCT Pub. Date: Jul. 27, 1995

[30] Foreign Application Priority Data

Jan. 21, 1994 [AU] Australia ................... PM3459

[51] Int. Cl.$^6$ .................................................. B29C 71/04
[52] U.S. Cl. .................. 427/491; 427/536; 427/539; 427/544; 427/553; 427/560; 427/601; 156/73.1; 156/272.6
[58] Field of Search ................. 156/73.1, 272.2, 156/272.6; 522/129; 264/22; 427/489, 491, 536, 539, 553, 543, 544, 560, 600, 601, 346; 204/157.62

[56] References Cited

U.S. PATENT DOCUMENTS

| 3,286,009 | 11/1966 | Yumoto et al. . |
| 4,094,756 | 6/1978 | Taylor . |
| 4,689,244 | 8/1987 | Lusk . |
| 5,041,303 | 8/1991 | Wertheimer et al. . |
| 5,070,041 | 12/1991 | Katayama et al. . |
| 5,178,802 | 1/1993 | Cree et al. . |

FOREIGN PATENT DOCUMENTS

| 0311989 | 4/1987 | European Pat. Off. . |
| 311989 | 4/1989 | European Pat. Off. . |
| 2664282 | 1/1992 | France . |
| 59-204679 | 11/1984 | Japan . |
| 1-292173 | 11/1989 | Japan . |

*Primary Examiner*—Michael W. Ball
*Assistant Examiner*—Sam Chuan Yao
*Attorney, Agent, or Firm*—Cushman Darby & Cushman Intellectual Property; Group of Pillsbury Madison & Sutro, LLP

[57] ABSTRACT

A method of modifying at least part of the surface of a polymer or polymer matrix composite material including: (i) oxidising at least part of the surface of the polymer or polymer matrix material and (ii) subsequently treating the oxidised surface with an organofunctional coupling agent and/or chelating agent, simultaneously with a static and/or a high frequency alternating physical field.

18 Claims, No Drawings

SURFACE TREATMENT OF POLYMERS

This application claims benefit of international application PCT/AU95/00025, filed Jan. 20, 1995.

This invention relates to new methods of treating the surface of polymers and/or polymer matrix composite materials to modify the surface chemistry thereof. For example, it is desirable to treat the surface of polymers or polymer matrix composite materials to improve their ability for bonding to other materials including, but not limited to, adhesives, sealants, paints, and any other reactive and/or non-reactive organic, inorganic or metallic materials, or mixtures thereof.

By the term "polymer", as used herein, we mean homopolymers, co-polymers and/or their blends and alloys with other polymers and/or rubber, and polymer matrix composites.

In a preferred application of the invention, it is desirable to establish a strong and durable adhesive bond between a polymer substrate or a polymer matrix and another polymeric and/or non-polymeric material such as a thermoset,- or thermoplastic resin, paint or coating.

In order for the adhesive bond and/or composite material to perform satisfactorily, there must be good adhesion between the substrate (e.g. flat sheet, or fibre, complex shaped article, or powder) and the adhesive, paint, coating, thermoplastic, thermoset resin or non-polymeric material. However, it is well known that many polymeric substrates (e.g. polyolefins), are difficult to bond due to the absence of specific surface chemical functional groups capable of providing reactive sites for the establishment of strong interfacial interactions such as acid-base interactions and/or the formation of chemical bonding (e.g. covalent, ionic, etc.) between the untreated substrate and the adhesive, paint, matrix material or other adhering substance.

Various types of surface treatments are available for increasing the bonding properties of polymers. Typical surface treatments for enhanced adhesion include: mechanical abrasion; corona discharge; flame treatment; plasma treatment; UV radiation, chemical oxidation with the use of oxidising agents; and introduction of functional groups by surface chemical grafting.

Japanese Patent Document No. Sho 58-132029 discloses a method of treating the surface of polymers comprising corona discharge or plasma treatment followed by a chemical treatment. The chemical treatment described refers to the combination of two or more of the following processes: treating with an acid; treating with an alkali; treating with a coupling agent such as a silane or a titanium-based coupling agent. Whilst the combination of treatments is shown as being effective for increasing the adhesive properties of polymeric substrates the need for at least two chemical process steps substantially increases the cost associated with industrial application.

Japanese Patent Document No. Sho 64-80099 discloses a method of increasing the ability of polyimides to bond to adhesives by treating the surface of the polyimide with corona discharge, and then treating the surface with a silane based coupling agent. To achieve the result disclosed in this specification concentrations of silane based coupling agents must typically be such that the silane coverage rate is in the range of 25 to 50 mg/m$^2$ when dry. This, although not specified in the invention, can be achieved upon application of a silane solution at the concentration estimated to be about 3.75% to 7.5%.

It has now been found, surprisingly, that the ability of polymers or polymer matrix composite materials to be durably bonded to thermoplastic or thermoset polymers and/or inorganic or metallic binders in the form of adhesives, paints, coatings, matrix materials or other substances may be improved by the use of very low concentrations, and/or otherwise ineffective concentrations of organofunctional coupling agents and/or chelating agents by suitable co-treatment steps.

In its broadest aspect the present invention provides a method of modifying at least part of the surface of a polymer or polymer matrix composite material including:

i) oxidising at least part of the surface of the polymer or polymer matrix material, and ii) subsequently treating the oxidised surface with an organo-functional coupling agent and/or chelating agent, simultaneously with a static and/or high frequency alternating physical field.

The method of the invention may be used in respect of any suitable polymer or polymer matrix composite material. For example, it may be used in respect of a polyolefin such as low density polyethylene (LDPE), polypropylene (PP), high density polyethylene (HDPE), ultra high molecular weight polyethylene (UMVVWPE), or blends of polyolefins with other polymers or rubber. It may also be used in respect of other difficult to bond materials or polymeric materials such as, Acetal, PVDF, teflon (PTFE), polystyrene, PMMA, PVC, ABS, EDPM, aramid fibres, ultra-high modulus polyethylene fibres or carbon fibres.

In step i) any suitable method may be used to initially oxidise at least part of the surface of the polymer or polymer matrix composite. Such techniques include corona discharge, chemical oxidation, flame treatment, plasma treatment, or UV radiation. However, for the present method the technique of corona discharge, flame treatment or chromic acid treatment is preferred.

Suitable corona discharge energies range from 0.1–5000 mJ/mm$^2$ but more preferably 10–80 mJ/mm$^2$. Suitable treatment times and discharge energies can be calculated using the following equation:

$$t = d/v_1 \text{ (or } v_2\text{)}$$

where $$E = Pn/lv_1$$

or $$E = Pn/lv_2$$

t=treatment time for a single pass of treatment under the electrode.
d=electrode diameter
E=discharge energy
P=power energy
n=number of cycles of treated substrate moving under the electrode
l=length of treating electrode
$v_1$=speed of treating table
$v_2$=speed of conveyor tape (i.e. continuous treatment)

When plasma glow discharge treatment is used, the range of suitable energies is 5–5000 Watts for 0.1 seconds–30 minutes, but more preferably 20–40 Watts for 1 to 60 seconds.

Alternatively, any known flame treatment may be used to initially oxidise at least part of the surface of the polymer or polymer matrix material. For example, the flame treatment described in "Preparing Polyolefin Surfaces for Inks and Adhesives", R L Ayres and D L Shofner, SPE Journal, Vol 28, page 51, (December 1972) and Ph.D. Thesis "Surface Modification of Polyolefins by Flame Treatment for Enhancement of Adhesion", D Y Wu, Haute Alsace University, Mulhouse, France (1991), may be used. Similarly, any known chemical oxidation may be used to initially oxidise at least part of the surface of the polymer or polymer matrix material. For example, chromic acid treatment such as those described in "Adhesives Technology Handbook", Arthur H Landrock, Noyes Publications, USA 1985, may be used.

In step ii) any suitable organo-functional coupling agent or chelating agent may be used. For example, any suitable organo-functional silane, organo-zirconate, organo-titanate, organo-tin or organo-aluminate may be used. These coupling agents may be applied from solution, vapour or any type of mechanical dispersion of a pure coupling agent or their solution and/or mixtures in any suitable solvent. If used as a solution the coupling agent may be applied as a water-based solution or in non-aqueous solution with a solvent such as an organic solvent or a mixture of both.

Preferred solvents used for preparing the solution are water, and alcohols (e.g. isopropyl alcohol or ethyl alcohol).

Any suitable concentration of coupling agent may be present in the solution. Preferably the concentration of coupling agent is at least 0.0000025% and ranges up to approximately 0.25%. The method of the present invention allows for use of very low concentrations of coupling agents which minimises the cost of the treatment. The concentrations which can be used in the method of the invention were previously thought to be not effective to modify the surface of a polymer or polymer matrix composite material.

The organo-functional coupling agent or chelating agent may be applied for any suitable time period, for example from 0.01 seconds to 6 hours. Preferably, the compounds are applied for 1 to 30 seconds.

When an organo-functional silane is used, it preferably has the general structure $X_a S_i Y_b$, wherein X is an non-hydrolyzable organo-functional alkyl group, Y is a hydrolyzable group, a is an integer from 1 to 3, and b is 4-a. In a particularly preferred group the organofunctional silane has the structure $X_a Si (OR)_b$ where X is an non-hydrolyzable organo-functional group bonded to silicone through a stable covalent bond, R is any suitable alkyl group, preferably methyl or ethyl, a is an integer from 1 to 3 and b is 4-a. The silanol groups obtained after hydrolysis of the alkoxy groups may react with the hydroxyl and/or other functional groups introduced onto the surface of the polymer.

For a given application, an organosilicon or organometallic or chelating compound(s) may be chosen in which the organo-functional groups have the maximum reactivity with the adhesive. For example, if the substrate to be modified is to be bonded to a cyanoacrylate, an amino-functional coupling agent would be selected. Whilst if the substrate is to be bonded to an epoxy resin an amino-functional or epoxy-functional coupling agent would be chosen.

In step ii) of the method of the invention any suitable static and/or high frequency alternating physical field may be used. For example, any one of the following fields may be used, ultrasonic, microwave, radio-frequency, heat energy or a combination thereof. Preferably an ultrasonic field is used.

The preferred frequency range of ultrasonic energy field ranges between 1- to 500 kHz, more preferably between 10 to 50 kHz.

Following treatment of a polymer or polymer matrix composite by the method of the invention the treated surface may be adhesively bonded to another substrate, or coated by a paint, or a metallic coating, or printed.

When adhesively bonded to another substrate any suitable adhesive may be applied to the treated surface and then the other substrate is brought into contact with the adhesive. Suitable adhesives include, for example, structural acrylic adhesives, epoxy adhesives, sealants, contact adhesives or thermoplastic adhesives. Examples of particularly suitable adhesives include, but are not limited to Cyanoacrylate Loctite 406, acrylic Permabond F241, epoxy Araldite 138, and polyurethane Tyrite 7520A/B. Alteratively any suitable self adhesive tape may be applied to the treated surface and then the other substrate may be brought into contact with the tape.

When the treated substrate is coated by a paint or printed with an ink, any suitable paint or ink may be used.

Similarly, when the treated substrate is coated with a metallic material, any suitable metallic material may be used.

The invention will now be described with reference to the following examples. It will be appreciated that the examples are provided for the purposes of illustrating the invention and that they in no way should be seen as limiting the scope of the above description.

In the examples, the surface of a range of substrates (polymers or polymer matrix composite materials) are treated by various methods and bonded.

After bonding, the specimens were allowed to cure for 72 hours prior to strength testing using single lap-shear test with an overlap of 3 mm and an Instron mechanical tester. The test rate was 10 mm/min.

EXAMPLE 1

In this example the surface of samples with dimension of 50×25×3 mm (length×width×overlap) of low density polyethylene (LDPE), high density polyethylene (HDPE) and polypropylene (PP) were treated by various methods and were then bonded with a cyanoacrylate adhesive (Loctite 406).

The various surface treatments were:

i) no treatment ii) air corona discharge only (for LDPE a corona discharge level of 453 mJ/mm² was used and for HDPE and PP a corona discharge level of 755 mJ/mm² was used)

iii) air corona discharge followed by dipping the substrate in 0.01% Z-6020 in isopropanol [Z-6020;- (N - (2-aminoethyl) - 3 - aminopropyl-trimethoxy silane)] for 30 seconds and iv) air corona discharge followed by dipping for 30 sec the substrate in 0.01% Z-6020 in isopropanol simultaneously with ultrasonic energy (35 kHz) for 30 seconds.

After curing, the strength of the bond for the samples was tested to compare the relative results of different surface treatments. The results of the tests are recorded in Table 1.

TABLE 1

| | Lap shear strength (MPa) of LDPE, HDPE, and PP following surface treatments and application of Loctite 406 adhesive | | | |
|---|---|---|---|---|
| Polymer | No Treatment | Corona Only | Corona + 0.01% Z-6020 (dip) | Corona + 0.01% Z-6020 and U/S* |
| LDPE | 0.1 | 2.8 | 7.4 | 9.0* |
| HDPE | 0.3 | 1.5 | 6.4 | 14.6* |
| PP | 0.1 | 0 | 9.3 | 16.3* |

*indicates substrate failure
+U/S - Ultrasonic Energy

As can be seen from the above table, surface treatment with air corona only achieved little or no bond strength. With air corona followed by dipping in a coupling agent solution the bond strength increased. However, with air corona followed by dipping in the coupling agent solution whilst simultaneously applying ultrasonic energy (U/S) substantial bond strength was achieved. In fact for all the samples consisting of polymer substrates treated by air corona followed by dipping in the amino-silane (Z-6020) coupling agent solution whilst simultaneously applying ultrasonic energy, the bond strength was so high that the failure occurred within the polymer substrate prior to the failure of the interface.

EXAMPLE 2

In this example the surface of samples of polypropylene (PP) and high density polyethylene (HDPE) were treated by various methods (as shown in Table 2) and were then bonded with Loctite 406.

In all the treatments the samples were treated with air corona discharge at a level of 755 mJ/mm$^2$. The samples were then either not treated any further prior to applying the adhesive or dipped in a solution of Z-6020 or TEAZ (Triethanolamine zirconate-organozirconate) for 30 seconds or dipped in the same types of solutions whilst simultaneously applying ultrasonic energy to the solution at 35 kHz for 30 seconds.

Isopropyl alcohol was used as the solvent for both Z-6020 and TEAZ solutions.

sonic energy (35 kHz) provides a substantially stronger bond than when air corona discharge only is used.

TABLE 3

Lap shear strengths of specimens of LDPE, HDPE and PP bonded with Cyanoacrylate, Epoxy, polyurethane and Acrylic adhesives.

| | | | Lap shear strength (MPa) | |
|---|---|---|---|---|
| Adhesive | Polymer | Corona Level (mJ/mm$^2$) | Corona Only | Corona + 0.01% Z-6020 (U/S$^+$) |
| Polyurethane | HDPE | 453 | 5.5 | 6.9 |
| (Tyrite-7520 A/B) | PP | 755 | 8.8 | 12.8 |
| Epoxy | HDPE | 755 | 11.9 | 14.2 |
| (Araldite 138) | PP | 16.1 | 5.7 | 10.4 |
| Epoxy | HDPE | 453 | 6.4 | 11.4 |
| (LC191) | PP | 50.4 | 5.9 | 10.3 |
| Acrylic | LDPE | 50.4 | 1.6 | 4.7 |
| (F241) | HDPE | 755 | 1.4 | 4.0 |
| | PP | 453 | 0.5 | 2.1 |
| Cyanoacrylate | LDPE | 453 | 2.8 | 9.0* |
| (Loctite 406) | HPDE | 755 | 1.5 | 14.6* |
| | PP | 755 | 0 | 16.3* |

*indicates substrate failure
$^+$U/S — Ultrasonic Energy

TABLE 2

Lap shear strength (MPa) of HDPE and PP following treatment with various concentrations of coupling agents and Loctite 406 adhesive.

| Polymer | Corona Only | Corona + 0.01% coupling agent | | Corona + 0.005% coupling agent | | Corona + 0.0005% coupling agent | | Corona + 0.0000025% coupling agent | |
|---|---|---|---|---|---|---|---|---|---|
| | | Dip | U/S$^+$ | Dip | U/S$^+$ | Dip | U/S$^+$ | Dip | U/S$^+$ |
| HDPE (Z-6020) | 1.5 | 64 | 14.6* | 4.3 | 13.9 | 3.0 | 10.5 | 5.7 | 10.6 |
| PP (Z-6020) | 0 | 9.3 | 16.3* | 4.2 | 14.7* | 2.8 | 7.7 | 3.5 | 6.6 |
| HDPE (TEAZ) | — | 9.3 | 11.3 | — | — | 5.6 | 10.0 | — | — |
| PP (TEAZ) | — | 7.2 | 16.5* | — | — | 3.9 | 6.1 | — | — |

*indicates substrate failure
$^+$U/S — Ultrasonic Energy

The results above indicate that substantially improved bond strengths can be obtained especially when different types of coupling agents are applied with simultaneous ultrasonic energy. In addition the above results indicate that the use of simultaneous ultrasonic energy allows for very low concentrations of coupling agents to be used. In particular, it can be seen that reasonable bond strength can be obtained when concentrations as low as 0.0000025% of (i.e. 2.5 ppm) Z-6020 are used.

EXAMPLE 3

In this example the surface of samples of low density polyethylene (LDPE), high density polyethylene (HDPE) and polypropylene (PP) were treated by air corona discharge only, or by air corona discharge followed by a 30 sec dip in 0.01% Z-6020 in isopropanol with simultaneous ultrasonic energy.

Following the above treatments, various adhesives as shown in Table 3 were then bonded to the substrate surfaces.

After curing of the adhesives the strength of the bonds were tested. The results of the tests indicate for a wide range of adhesives that air corona followed by dipping in an amino silane (Z-6020) solution for 30 sec with simultaneous ultra-

EXAMPLE 4

In this example the surface of samples of low density polyethylene were treated with various methods (as shown in Table 4) and were then bonded with Loctite 406.

The various methods were:

i) dip in chromic acid at 60° C. for various times as shown in Table 4, ii) dip in chromic acid at 60° C. for various times as shown in Table 4, followed by a 30 sec dip in 0.01% Z-6020 in isopropanol with simultaneous ultrasonic energy (30 kHz), iii) dip in chromic acid at 80° C. for various times as shown in Table 4, and iv) dip in chromic acid at 80° C. for various times as shown in Table 4, followed by a 30 sec dip in 0.01% Z-6020 in isopropanol with simultaneous ultrasonic energy (30 kHz).

It is seen from the results presented in Table 4 that application of an amino silane (Z-6020) solution with the simultaneous ultrasonic energy (35 kHz) provides significantly stronger bonds than those obtained after just chromic acid etching. When also compared with the results of the earlier examples, it can be seen that the method of the invention is not reliant on the use of air corona discharge as the only available method for initially oxidising the surface of the polymer or polymer matrix material.

TABLE 4

Lap shear strength (MPa) of LDPE following surface treatment with Chromic Acid and application of Loctite 406 adhesive.

| | Lap shear strength (MPa) | | | |
| --- | --- | --- | --- | --- |
| Chromic acid treatment time | Chromic acid (60° C., dip) | hromic acid (60° C., dip) + 0.01% Z-6020 and U/S+ | Chromic acid (80° C., dip) | Chromic acid (80° C., dip) + 0.01% Z-6020 and U/S+ |
| 30 s | 2.2 | 3.2 | 1.4 | 3.2 |
| 1 min | 2.0 | 3.2 | 1.2 | 3.2 |
| 5 mins | 2.0 | 4.3 | 1.2 | 4.3 |
| 15 mins | 2.1 | 4.7 | 1.2 | 4.7 |
| 30 mins | 2.0 | 4.8 | 2.3 | 4.8 |

+U/S — Ultrasonic Energy

EXAMPLE 5

In this example the surface of low density polyethylene (LDPE), high density polyethylene (HDPE), and polypropylene (PP) were treated by air corona discharge only, or by air corona discharge followed by a 30 second dip in 0.01% Z-6020 in isopropanol with simultaneous ultrasonic energy.

Following the above treatment, some bonded samples were tested for bond strength after allowing the adhesive to cure for 72 hours (i.e. dry) whilst other bonded samples were tested for bond strength after curing at room temperature for 72 hours in air and then being immersed in water for one month at a temperature of 60° C. (i.e. wet). The results of the tests are shown in Table 5.

TABLE 5

Dry and wet (one month exposure to 60° C. water) lap shear strengths of specimens LDPE, HDPE, PP bonded with Cyanoacrylate (Epoxy).

| | | | Lap shear strength (MPa) | | |
| --- | --- | --- | --- | --- | --- |
| | | | Corona Only | Corona + 0.01% Z-6020 (U/S)+ | |
| Adhesive | Polymer | Corona level (mJ/cm²) | Dry | Wet (1 month, 60° C.) | Dry | Wet (1 month, 60° C.) |
| Cyanoacrylate | LDPE | 453 | 2.8 | 0 | 9.0* | 7.0 |
| (Loctite 406) | HDPE | 755 | 1.5 | 0 | 14.6* | 10.1 |
| | PP | 755 | 0 | 0 | 16.3* | 6.8 |
| Epoxy | HDPE | 453 | 6.4 | 4.3 | 11.4 | 6.1 |
| (LC191) | PP | 453 | 6.4 | 2.2 | 10.1 | 4.0 |

*indicates substrate failure
+U/S — Ultrasonic Energy

From the above tables it can be seen that in addition to the improved bond strength achieved when the coupling agent is applied simultaneously with ultrasonic energy that this treatment also provides a very durable strong bond. It will be appreciated by persons skilled in the art that numerous variations and/or modifications may be made to the invention without departing from the spirit and scope of the invention as broadly described. The present embodiments are, therefore, to be considered in all respects as illustrative and not restrictive.

We claim:

1. A method of modifying at least part of the surface of a polymer or polymer matrix composite material comprising:

(i) oxidizing at least part of the surface of the polymer or polymer matrix material, and (ii) subsequently treating the oxidized surface with an organofunctional coupling agent and/or organofunctional chelating agent, simultaneously with a static physical field and/or a high frequency alternating physical field selected from the group consisting of an ultrasonic field, a microwave field and a radio frequency field.

2. A method according to claim 1 wherein the surface of the polymer or polymer matrix material is oxidized by corona discharge, flame treatment, plasma treatment, chemical oxidation or ultraviolet radiation.

3. A method according to claim 2 wherein in step ii) the oxidized surface is treated with a low concentration of an aqueous or non-aqueous solution of an organofunctional coupling agent and/or chelating agent.

4. A method according to claim 1 wherein the high frequency alternating physical field is an ultrasonic field and has a frequency in the range of 1 to 500 kHz.

5. A method according to claim 4 wherein the ultrasonic field has a frequency of approximately 10 to 50 kHz.

6. A method according to claim 1 wherein the high frequency alternating physical field is a microwave field and has a frequency in the range of 1 GHz to 300 GHz.

7. A method according to claim 1 wherein the high frequency alternating physical field is a radio frequency field and has a frequency in the range of 10 kHz to 1 GHz.

8. A method according to claim 1 wherein the organofunctional coupling agent and/or organofunctional chelating agent is selected from any organofunctional silane, organo-zirconate, organo-titanate, organo-tin or organo-aluminate.

9. A method according to claim 8 wherein the organofunctional coupling agent and/or organofunctional chelating agent has the general structure:

wherein X is an organoreactive alkyl group, Y is an hydrolyzable group, a is an integer from 1 to 3, and b is 4-a.

10. A method according to claim 8 wherein the organofunctional coupling agent and/or organofunctional chelating agent has the general structure:

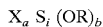

wherein X is an organo-functional group bonded to the silicon atom through a stable covalent bond, R is any suitable alkyl group, a is an integer from 1 to 3, and b is 4-a.

11. A method according to claim 8 wherein the organofunctional coupling agent and/or organofunctional chelating agent is an aminofunctional coupling agent.

12. A method according to any one of claims 8 to 11 wherein the organofunctional coupling agent and/or organofunctional chelating agent is present as a solution in a concentration of less than 3.75%.

13. A method according to claim 12 wherein the concentration of organofunctional coupling agent or organofunctional chelating agent is approximately within the range of 0.25% to 0.0000025%.

14. A method of modifying at least part of the surface of a polymer or polymer matrix composite material comprising:

(i) oxidizing at least part of the surface of the polymer or polymer matrix material, and (ii) subsequently treating the oxidized surface with an organofunctional coupling agent and/or organofunctional chelating agent, simultaneously with a high frequency alternating physical field selected from the group consisting of an ultrasonic field, a microwave field and a radio frequency field.

15. A method according to claim 14, wherein the high frequency alternating physical field is an ultrasonic field and has a frequency in the range of approximately 1 to 500 kHz.

16. A method according to claim 15, wherein the ultrasonic field has a frequency in the range of approximately 10 to 50 kHz.

17. A method according to claim 14, wherein the high frequency alternating physical field is a microwave field and has a frequency in the range of approximately 1 GHz to 300 GHz.

18. A method according to claim 14, wherein the high frequency alternating physical field is a radio frequency field and has a frequency in the range of approximately 10 kHz to 1 GHz.

* * * * *